Oct. 10 1933.   S. V. DILLON   1,930,194
PIPE COUPLING
Filed June 28, 1930   4 Sheets-Sheet 1

Inventor
S. V. Dillon,
By Robt. E. Barry
Attorney

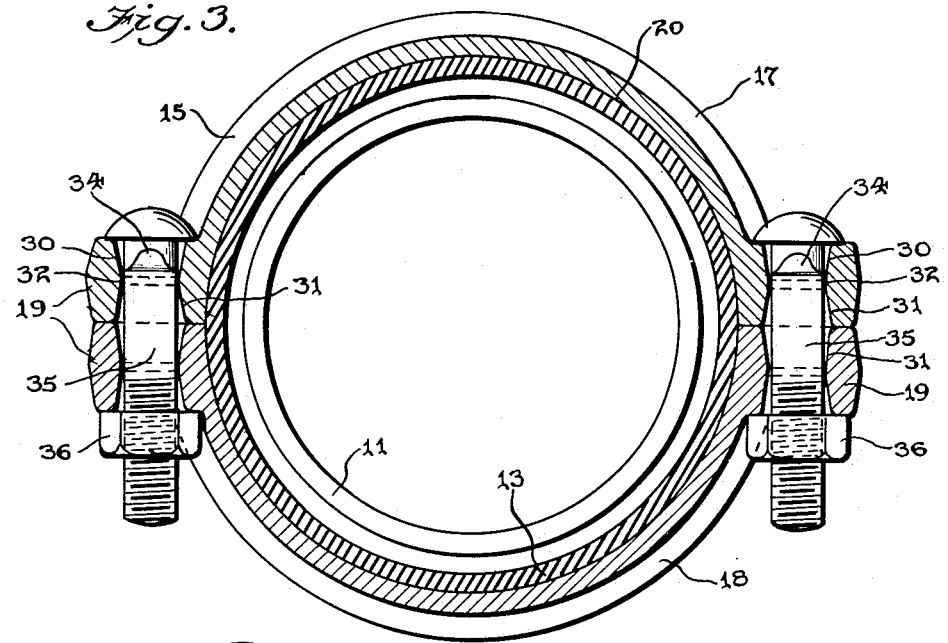
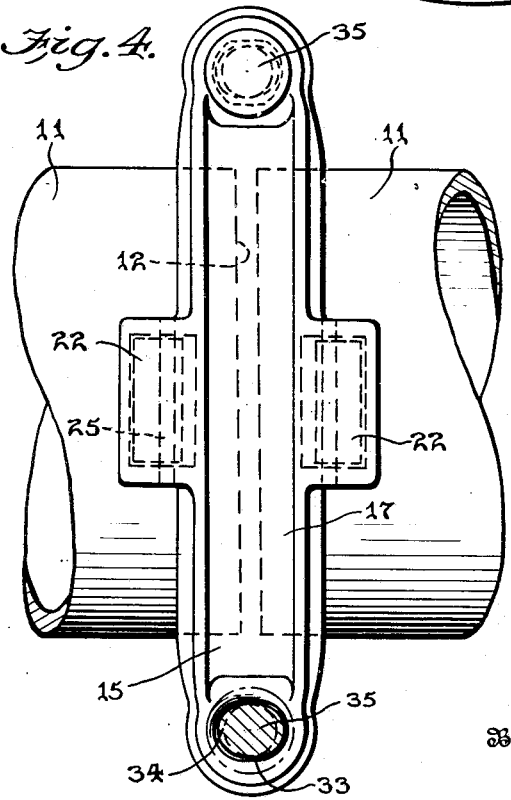
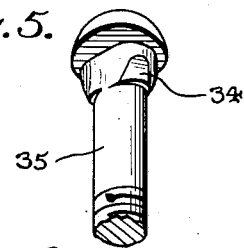
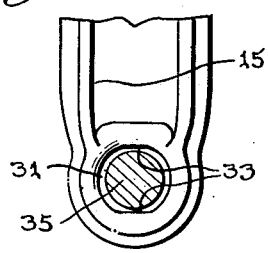

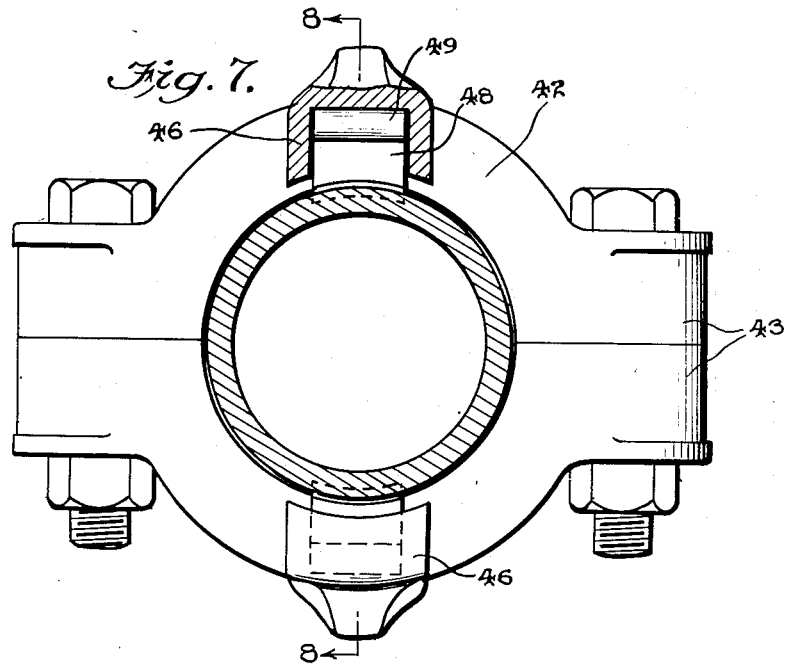
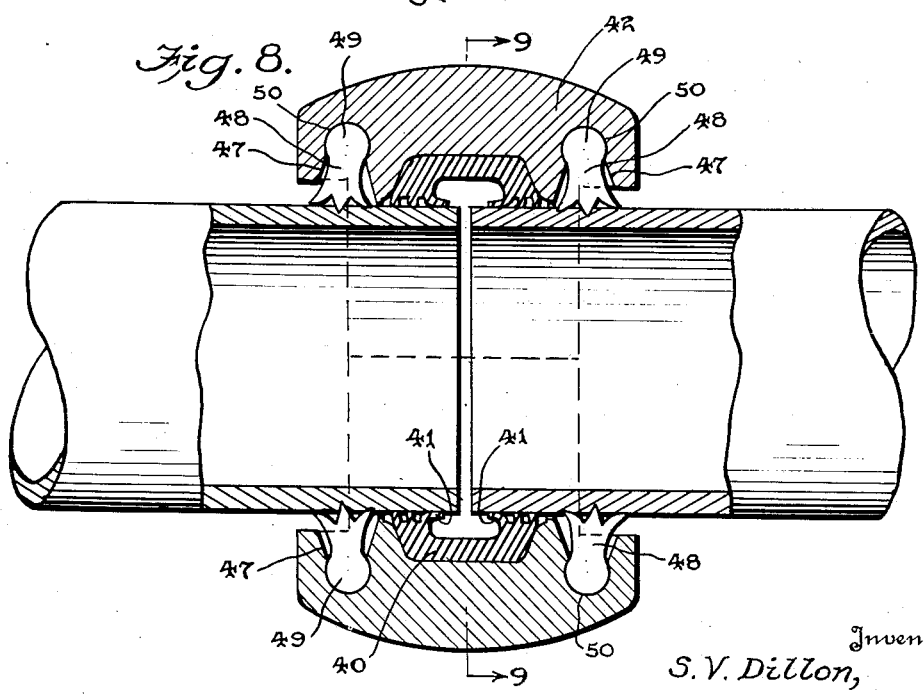

Oct. 10 1933. S. V. DILLON 1,930,194
PIPE COUPLING
Filed June 28, 1930 4 Sheets-Sheet 4
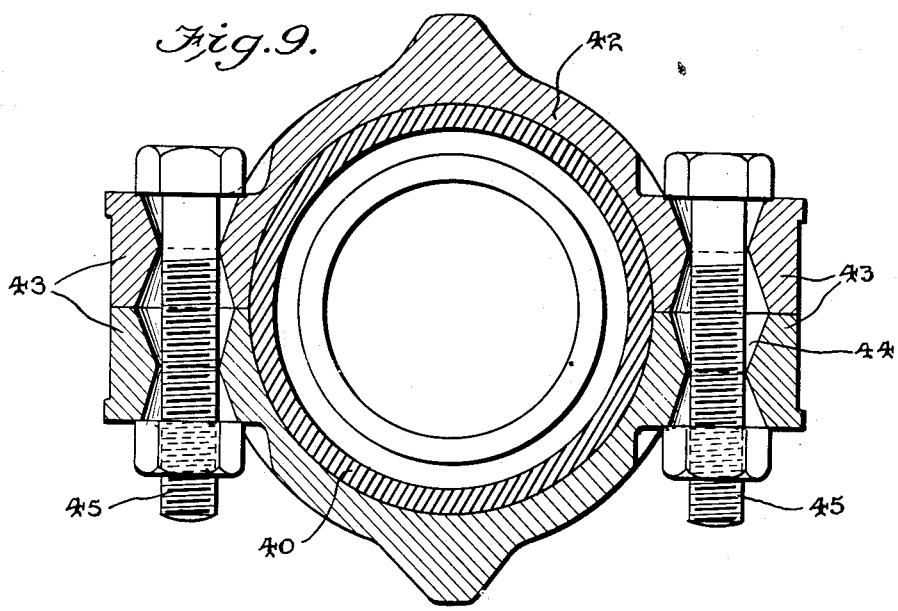
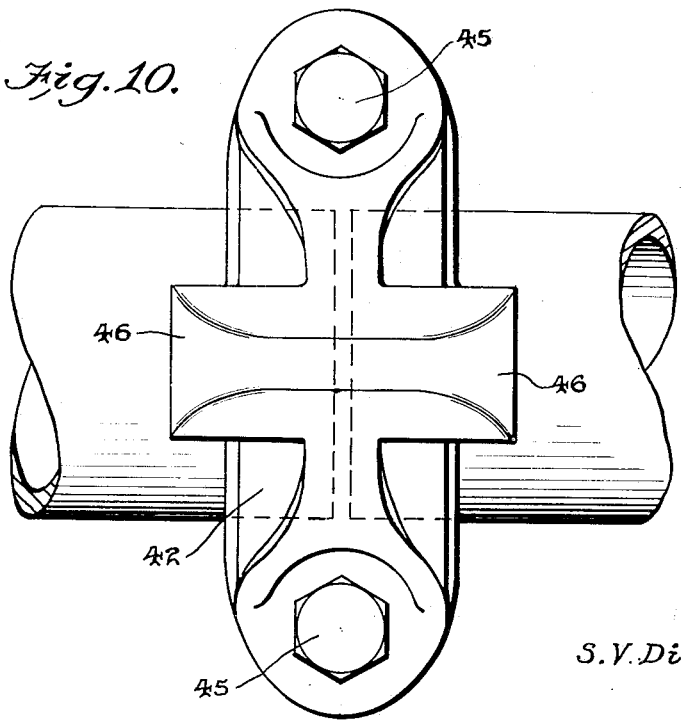
Inventor
S. V. Dillon,
By Robt. E. Barry
Attorney

UNITED STATES PATENT OFFICE 1,930,194

PIPE COUPLING

Stephen V. Dillon, Tulsa, Okla.

Application June 28, 1930. Serial No. 464,539

10 Claims. (Cl. 285—194)

This invention relates to improvements in pipe couplings of the flexible or expansion types, and one of the salient objects of the invention is to provide a coupling which may be used with ordinary plain end pipes.

Heretofore, joints have been employed comprising a sealing ring which is grooved internally to receive a pressure fluid conducted by a pipe line in which the joint is interposed, and such ring spans the adjacent ends of the pipes, and is held in position by a metal housing, usually consisting of two half collars.

In practice, such housing had to be interlocked with the pipe ends, for otherwise, flexing of the pipe line, or contraction thereof, would be liable to cause the pipe end to disengage the packing ring, the housing, or both, and this of course resulted in a parted joint. The grooving of the pipes for interlocking them with the joint housing; is not feasible where the pipes have thin walls, and furthermore, as the pipe ends are often out of round, the machining is difficult and frequently inaccurate, and sometimes results in cutting through the wall of the pipe.

My improved coupling eliminates the necessity of grooving the pipes.

Another object of the invention is to furnish a coupling including movable or rockable toothed pawls which may readily move with the pipes during expansion and contraction, or flexure of the same, but which will firmly grip the pipe ends, regardless of the relative movement of the pipes and the joint housing.

A further object is to provide a coupling having a sectional ring housing in which each section of the housing has a pair of specially apertured ears. The aperture in each ear is of biconical shape, which constitutes a port of substantially venturi form. Consequently, the enlarged mouths of such ports facilitate the passage of a securing bolt through a pair of the ears in order that the housing sections may be rapidly assembled and applied, and then when a nut is placed upon the bolt and tightened, the internal contracted portions or annular ridges within the ports will cooperate with the surface of the shank of the bolt to cause the ears to come into true registration, whereby the sections of the housing will be moved into alignment, and the packing ring will be brought into or kept in proper position to function, and there will be no liability of leaky joints, due to the failure of an inexperienced operator to connect the housing sections as they should be.

Another object is to provide a coupling housing of such configuration that it may be made of drop forged sections.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 3 is a transverse sectional view on the line 3—3 of Fig. 2.

Fig. 4 is a top plan view of the joint.

Fig. 5 is a perspective view of a portion of one of the bolts employed to connect the housing sections.

Fig. 6 is a plan of one of the housing section ears with the bolt omitted.

Fig. 7 is an end elevation partly in transverse vertical section of a modified form of the coupling.

Fig. 8 is a longitudinal vertical sectional view of the modification.

Fig. 9 is a transverse sectional view on the line 9—9 of Fig. 8.

Fig. 10 is a plan view of the modification.

Figure 1:
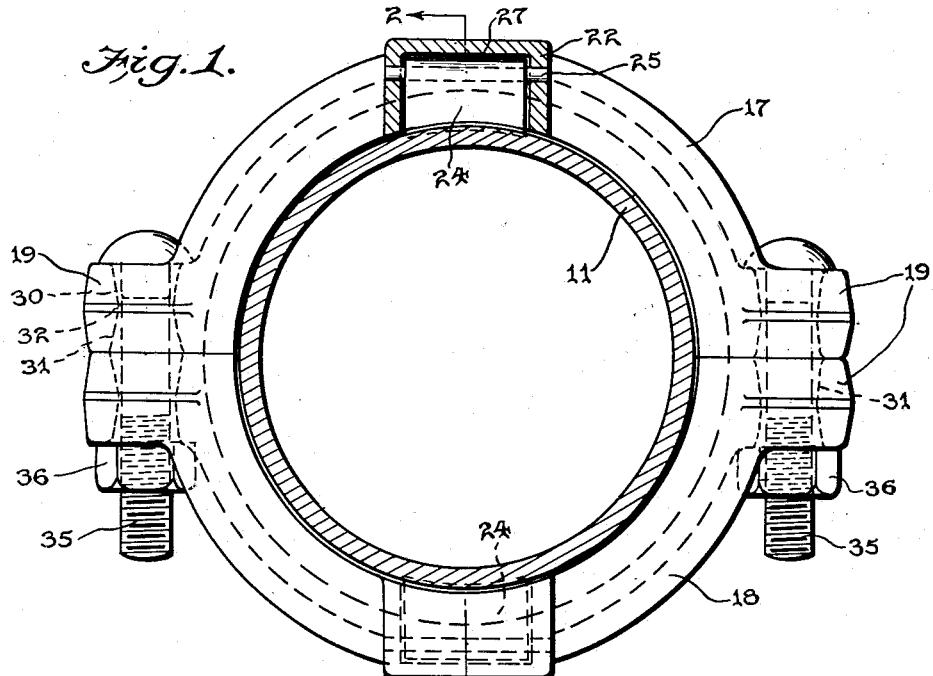
Fig. 1 is an end elevation of my improved coupling shown in position on a pipe line, and partially in section to facilitate illustration.

In the drawings, 11 designates ordinary plain end pipes forming a part of a pipe line, and as my invention eliminates the necessity of specially shaping the pipe ends, obviously the pipe walls may be made as thin as desired, depending on the pressure, of course, of the fluid to be conducted through the pipe line. The space 12 between the pipe ends is spanned by a resilient sealing ring 13 which may be of rubber or the like, and which forms an internal groove 14 to allow the conducting fluid to press the ring against the outer surface of the pipes, as well as against the housing 15. The ring has inturned flanges 16, each terminating in a plurality of lips 17 which form a multi-seal at each side of the ring.

The pipe ends and the sealing ring are retained in position by the housing 15, which is preferably made of a plurality of drop forged metal sections 17, 18, each section being in the form of a segment of a ring, and provided with outwardly extending radially projecting ears 19.

The housing sections provide an internal annular groove 20 to receive the sealing ring; and to facilitate the manufacture of the sections from drop forgings, the external surface of each section has a semi-circular groove 21 in its exterior which extends from one ear to the other and provides a pair of semi-circular ridges 22 which also extend between the ears and form reinforcements at the side edges of each section.

Preferably, midway between the ears of each section, the latter has oppositely extending lugs 23 which form housings for movable or rocking pawls 24 that function on the toggle principle. Each of these pawls may be secured to its respective housing by a pivot pin 25 which will allow the pawl to rock lengthwise of the pipe line. The teeth 26 of each pawl are preferably cut on an arc, with the central tooth projecting to a greater extent than the end teeth, and one or more of which teeth bite into the pipe ends 11 when the housing is secured to the pipe ends.

Figure 2:
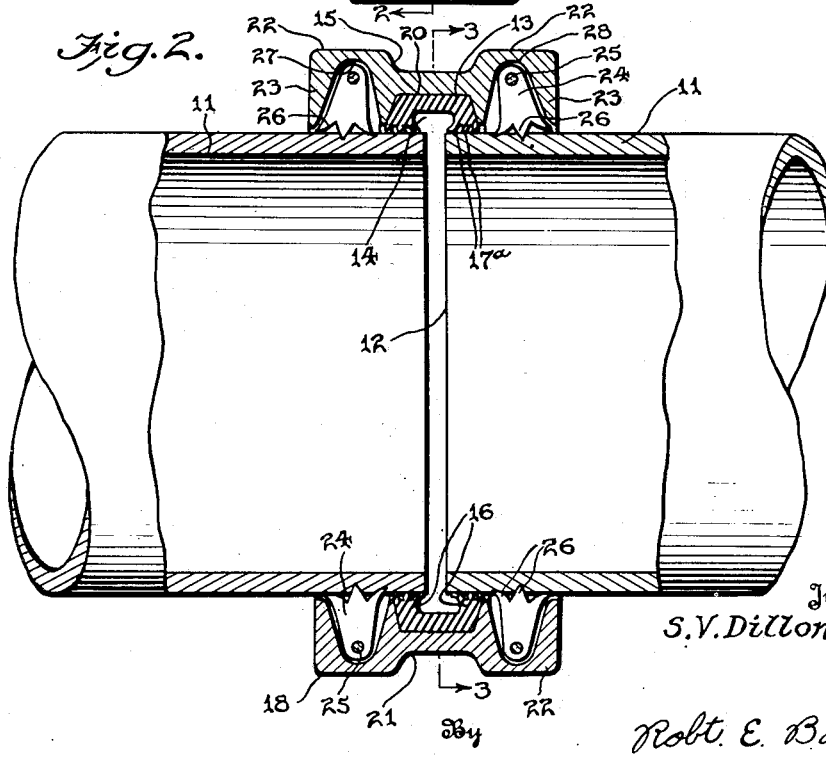
Fig. 2 is a longitudinal sectional view on the line 2—2 of Fig. 1.

From Fig. 2 it may be seen that if one of the pipes moves toward the other, the toothed ends of the pawls engaging the moving pipe will rock toward the other pawls, and one or more of the teeth of each rocking pawl will still bite into the wall of the moving pipe and prevent the latter from disengaging the housing, while the pipe is moving a definite distance, depending on the size of each pawl and its cavity, or each pawl or its cavity. On the other hand, if the same pipe moves away from the other, the same pawls will rock in the opposite direction, but some of their teeth will still bite into the moving pipe, and maintain the joint in proper condition. Obviously, this movement of the pipes or pawls will not interfere with the seal provided by the lips 17, as the latter are held tightly compressed against the surfaces of the pipes by means of the housing.

While the pawls are shown held in place by the pins 25, it will be noted that even if a pin should break, the curved upper end 27 of the pawl will simply move out against the curved end 28 of its recess, and the pawl will still function for the desired purpose. As a matter of fact, if desired, the fulcrum pins 25 may be omitted entirely, and in such case, the pawls would simply be inserted in their housings during the assemblage of the coupling, and if desired, retained in some simple manner.

I have found in practice, that couplings having housings of the segmental ring type, the sections of which are secured together by bolts, are liable to be improperly placed on the pipe line by inexperienced or careless operators, with the result that the housing sections, when the bolts are drawn tight, will be out of true alignment, and this may result in distortion of the sealing ring and a faulty joint. To eliminate the difficulty, I so shape my coupling that an operator in applying the housing, will have to bring the housing sections into alignment if he tightens the bolts to their full extent. For this purpose, each of the ears 19, as best shown in Fig. 3, has a bi-conical aperture or port made up of annular flared surfaces 30 and 31 which merge into one another along an annular ridge 32. The flaring portion 30 preferably has its sides slightly flattened or straightened as at 33 in Fig. 6, to cooperate with flattened surfaces 34 of the bolts 35 to prevent the latter from turning when the nut 36 is applied.

From Fig. 3 it may be seen that when the housing sections are placed on the pipe line, and the ears are brought into substantial alignment, if the operator inserts the end of the bolt, such end will first contact with the flaring surface 30 of the section 17, and it will be guided toward the aperture of the ear of the section 18, and then such end will feed into the flaring mouth 31 of the section 18. Obviously, these flaring surfaces act as guides for the bolt end, and even if the axes of the apertures should be offset relatively to one another, such surfaces will act to guide the bolt shank through the restricted portions of the apertures. Then, when the nut is applied and screwed up, the bolt shank will rock on the ridges or restricted portions 32, and the ears will be drawn into positive alignment. Consequently, the housing sections will be brought into correct position, and the sealing ring will be truly supported to function as it was intended to.

While I prefer to make the housing sections of drop forgings, they of course may be made of castings, preferably malleable or annealed castings, as illustrated in Figs. 7 to 10 inclusive. In this modification, I prefer to provide the inner lips of the sealing ring 40 with inturned extensions 41 which will more snugly engage the pipe ends and provide an increased contact surface. The ring in this instance, is held in position by cast metal housing sections 42, the ears 43 of which have bi-conical apertures 44 to cooperate with the bolts 45 in the same manner as explained in connection with the preferred embodiment of the invention.

The medial portion of each housing section is reinforced and projected laterally, as shown at 46, and the resulting enlargements form recesses 47 for the pawls 48. It will be observed in this form that the pivot pins are eliminated, and that the head of each pawl is in the form of a particylinder 49, which head rocks in a similarly shaped recess 50.

Of course, the form of the invention shown in Figs. 7 to 10 inclusive operates in the same manner as the preferred form.

Couplings of this character are especially useful for the handling of gas, oil, gasoline or the like, due to the fact that the sealing ring provides a multi-seal for each pipe, and in case one of the sealing lips should be defective, or should be damaged when the pipe ends are inserted into the sealing ring, the other lip will provide an insurance against leakage. Moreover, ordinary plain end pipes may be readily joined by the use of my coupling, without the necessity of treating a distorted pipe end to bring the same into true round for facilitating the special shaping of the pipe, as it is unnecessary, with my construction, to provide the pipe with grooves or the like. Furthermore, the rocking pawls allow for greater play, than if the coupling housing had lips extending into grooves in the pipes.

From the foregoing it is believed that the construction, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. The combination with a plurality of sections of pipe arranged in alignment with their adjacent ends spaced apart, of a coupling comprising a sealing ring spanning the extremities of the pipes, a housing securing the sealing ring in place, and rockable pawls carried by the housing and having teeth engaging said pipes, each tooth of the pawl being spaced from the axis of rocking the same distance as the extremity of every other tooth of the pawl, to permit the pawl to rock in both directions.

2. The combination with a plurality of pipe ends arranged in substantial alignment, of a sealing ring spanning the extremities of the pipes and having lips bearing upon the peripheries of the pipes, a sectional housing securing the sealing ring in place, and a rockable pawl carried by the housing and provided with teeth engaging the periphery of at least one of the pipes, each tooth of the pawl being spaced from the axis of rocking the same distance as the extremity of every other tooth of the pawl, to permit the pawl to rock in both directions.

3. The combination with a plurality of pipe ends arranged in substantial alignment, of a sealing ring surrounding the adjacent pipe ends and spanning the extremities of the latter, said ring having inwardly extending lips snugly engaging the peripheries of the pipes, a sectional housing surrounding the pipe ends and holding the sealing ring in compressed condition, and a rockable pawl secured to the housing and having teeth biting into one of said pipes, each tooth of the pawl being spaced from the axis of rocking the same distance as the extremity of every other tooth of the pawl, to permit the pawl to rock in both directions.

4. The combination with a pair of pipes arranged in alignment with one another, of a resilient sealing ring surrounding the ends of the pipes and having a groove to receive fluid from the pipes, said ring having inwardly extending sealing lips snugly engaging the peripheries of the pipes, a sectional housing surrounding the pipe ends and holding the sealing ring in position, and a plurality of rocking pawls carried by each one of the housing sections and having teeth biting into the peripheries of the pipes, the extremity of each tooth of each pawl being spaced from the axis of rocking the same distance as the extremity of every other tooth of the pawl.

5. The combination with a pair of pipes arranged in alignment with one another, of a resilient sealing ring surrounding the ends of the pipes and having a groove to receive fluid from the pipes, said ring having inwardly extending sealing lips snugly engaging the peripheries of the pipes, a sectional housing surrounding the pipe ends and holding the sealing ring in position, and a plurality of rocking pawls carried by each one of the housing sections and having teeth biting into the peripheries of the pipes, each side of the pawl and the housing having complementary surfaces adapted to abut against each other under certain circumstances.

6. The combination with a plurality of pipes arranged end to end and having their extremities slightly spaced apart, of a resilient sealing ring surrounding the pipe ends and having an internal groove communicating with the space between the pipe ends, said ring having inwardly extending sealing lips arranged at opposite sides of the groove and snugly engaging the peripheries of the pipes, a sectional housing removably mounted on the pipe ends and having a groove in which the sealing ring is seated, and pawls rockable in the housing and having teeth biting into the peripheries of the pipes, the extremity of each tooth of each pawl being spaced from the axis of rocking the same distance as the extremity of every other tooth of the pawl.

7. The combination with a plurality of pipes arranged end to end and having their extremities slightly spaced apart, of a resilient sealing ring surrounding the pipe ends and having an internal groove communicating with the space between the pipe ends, said ring having inwardly extending sealing lips arranged at opposite sides of the groove and snugly engaging the peripheries of the pipes, a sectional housing movably mounted on the pipe ends and having a groove in which the sealing ring is seated, and pawls rockable in the housing and having teeth biting into the peripheries of the pipes, each pawl being so mounted that movement of the pipe in either axial direction relatively to the housing will cause the teeth of the pawl to penetrate further into the pipe.

8. The combination with a plurality of pipes arranged end to end and having their extremities slightly spaced apart, of a resilient sealing ring surrounding the pipe ends and having an internal groove communicating with the space between the pipe ends, said ring having inwardly extending sealing lips arranged at opposite sides of the groove and snugly engaging the peripheries of the pipes, a housing formed of dropped forged sections removably mounted on the pipe ends and having a groove in which the sealing ring is seated, and pawls rockable in the housing and having teeth biting into the peripheries of the pipes, the extremity of each tooth of each pawl being spaced from the axis of rocking the same distance as the extremity of every other tooth of the pawl.

9. The combination with a pair of plain end pipes arranged in alignment with one another, of a resilient sealing ring surrounding the ends of the pipes and having a groove to receive fluid from the pipes, said ring having inwardly extending sealing lips snugly engaging the peripheries of the pipes, a sectional housing surrounding the pipe ends and holding the sealing ring in position, and a plurality of rocking pawls carried by each one of the housing sections and having teeth biting into the peripheries of the pipes, each pawl and the housing having complementary curved surfaces adapted to abut against each other under certain circumstances.

10. The combination with a plurality of sections of plain end pipe arranged in alignment with their adjacent ends spaced apart, of a coupling comprising a sealing ring spanning the extremities of the pipes, a segmental housing securing the sealing ring in place, and rockable pawls carried by the housing and having teeth engaging said pipes, the extremity of each tooth of each pawl being spaced from the axis of rocking, the same distance as the extremity of every other tooth of the pawl.

STEPHEN V. DILLON.